(12) United States Patent
Patton

(10) Patent No.: US 9,949,346 B2
(45) Date of Patent: Apr. 17, 2018

(54) CANDLE FLAME SIMULATION USING A PROJECTION SYSTEM

(71) Applicant: Luminara Worldwide, LLC, Eden Prairie, MN (US)

(72) Inventor: Douglas Patton, Irvine, CA (US)

(73) Assignee: Luminara Worldwide, LLC, Eden Prairie, MN (US)

( * ) Notice: Subject to any disclaimer, the term of this patent is extended or adjusted under 35 U.S.C. 154(b) by 331 days.

(21) Appl. No.: 14/761,917

(22) PCT Filed: Jan. 30, 2014

(86) PCT No.: PCT/US2014/013941
§ 371 (c)(1),
(2) Date: Jul. 17, 2015

(87) PCT Pub. No.: WO2014/120973
PCT Pub. Date: Aug. 7, 2014

(65) Prior Publication Data
US 2015/0338086 A1 Nov. 26, 2015

Related U.S. Application Data

(60) Provisional application No. 61/758,602, filed on Jan. 30, 2013.

(51) Int. Cl.
*F21V 33/00* (2006.01)
*H05B 37/02* (2006.01)
(Continued)

(52) U.S. Cl.
CPC ........ *H05B 37/0272* (2013.01); *F21S 10/043* (2013.01); *F21S 10/046* (2013.01);
(Continued)

(58) Field of Classification Search
CPC ..... H05B 37/0272; H04N 9/31; F21S 10/043; F21S 10/046; F21V 5/007; F21V 11/18; F21V 17/02; F21V 17/10; F21V 23/003; F21V 23/0442; F21V 31/00; F21V 33/0052
(Continued)

(56) References Cited

U.S. PATENT DOCUMENTS 6,802,782 B2 * 10/2004 Hall .................... A63J 5/023
40/427
7,159,994 B2 1/2007 Schnuckle et al.
(Continued)

FOREIGN PATENT DOCUMENTS

CN 1808263 A 7/2006
CN 102734740 A 10/2012
(Continued)

*Primary Examiner* — Bryon T Gyllstrom
(74) *Attorney, Agent, or Firm* — Umberg Zipser LLP

(57) ABSTRACT

Electric candles are described having a candle-shaped housing, a flame element extending from the housing and one or more projectors disposed within the candle-shaped housing such that a media file can be projected on to a first surface of the flame element using the pico projector. The flame element could be fixed or move with respect to the housing. The flame element could be transient and only exist when the candle is on.

12 Claims, 3 Drawing Sheets

(51) Int. Cl.
*F21V 11/18* (2006.01)
*F21V 23/04* (2006.01)
*F21V 5/00* (2018.01)
*F21V 23/00* (2015.01)
*H04N 9/31* (2006.01)
*F21S 10/04* (2006.01)
*F21V 17/02* (2006.01)
*F21V 17/10* (2006.01)
*F21V 31/00* (2006.01)
*F21Y 113/00* (2016.01)
*F21W 121/00* (2006.01)
*F21Y 113/10* (2016.01)

(52) U.S. Cl.
CPC ............ *F21V 5/007* (2013.01); *F21V 11/18* (2013.01); *F21V 17/02* (2013.01); *F21V 17/10* (2013.01); *F21V 23/003* (2013.01); *F21V 23/0442* (2013.01); *F21V 31/00* (2013.01); *F21V 33/0028* (2013.01); *F21V 33/0052* (2013.01); *H04N 9/31* (2013.01); *F21V 23/0464* (2013.01); *F21V 23/0471* (2013.01); *F21W 2121/00* (2013.01); *F21Y 2113/00* (2013.01); *F21Y 2113/10* (2016.08)

(58) Field of Classification Search
USPC .......................................................... 362/96
See application file for complete search history.

(56) References Cited

U.S. PATENT DOCUMENTS

| | | |
|---|---|---|
| 7,261,455 B2 | 8/2007 | Schnuckle et al. |
| 7,350,720 B2 | 4/2008 | Jaworski et al. |
| 7,481,571 B2 | 1/2009 | Bistritzky et al. |
| 7,503,668 B2 | 3/2009 | Porchia et al. |
| 7,686,471 B2 | 3/2010 | Reichow |
| 7,824,627 B2 | 11/2010 | Michaels et al. |
| 7,837,355 B2 | 11/2010 | Schnuckle |
| 8,070,319 B2 | 12/2011 | Schnuckle et al. |
| 8,132,963 B2 | 3/2012 | Patton et al. |
| 8,230,626 B2 | 7/2012 | Abileah et al. |
| 8,342,712 B2 | 1/2013 | Patton et al. |
| 8,523,692 B2 | 9/2013 | Osterman et al. |
| 8,534,869 B2 | 9/2013 | Patton et al. |
| 8,550,660 B2 | 10/2013 | Patton et al. |
| 8,646,946 B2 | 2/2014 | Schnuckle et al. |
| 8,696,166 B2 | 4/2014 | Patton et al. |
| 8,721,118 B2 | 5/2014 | Patton et al. |
| 8,727,569 B2 | 5/2014 | Schnuckle et al. |
| 8,789,986 B2 | 7/2014 | Li |
| 9,095,782 B2 | 8/2015 | Kaplan |
| 9,585,980 B1* | 3/2017 | Li ........................ A61L 9/03 |
| 9,605,824 B1* | 3/2017 | Li ......................... F21S 10/04 |
| 2001/0033488 A1 | 10/2001 | Chliwnyj et al. |
| 2005/0169666 A1 | 8/2005 | Porchia et al. |
| 2005/0285538 A1 | 12/2005 | Jaworski et al. |
| 2006/0034100 A1* | 2/2006 | Schnuckle ................ B44C 5/06 |
| | | 362/161 |
| 2006/0039835 A1 | 2/2006 | Nottingham et al. |
| 2006/0125420 A1 | 6/2006 | Boone et al. |
| 2006/0162198 A1* | 7/2006 | Hess ...................... F21S 10/04 |
| | | 40/428 |
| 2007/0127249 A1 | 6/2007 | Medley et al. |
| 2007/0177394 A1 | 8/2007 | Vock et al. |
| 2007/0242259 A1* | 10/2007 | Kawakami .............. G09F 13/04 |
| | | 356/25 |
| 2008/0031784 A1 | 2/2008 | Bistrizky et al. |
| 2008/0038156 A1 | 2/2008 | Jaramillo |
| 2008/0112154 A1* | 5/2008 | Reichow ................. F21S 10/04 |
| | | 362/96 |
| 2008/0130266 A1 | 6/2008 | DeWitt et al. |
| 2008/0154045 A1 | 6/2008 | Medley et al. |
| 2009/0241386 A1* | 10/2009 | Abileah .................. F24C 7/004 |
| | | 40/428 |
| 2010/0254155 A1 | 10/2010 | Capo et al. |
| 2010/0302464 A1* | 12/2010 | Raring .................. H04N 9/3129 |
| | | 348/744 |
| 2011/0019422 A1* | 1/2011 | Schnuckle ............. F21S 10/04 |
| | | 362/277 |
| 2011/0027124 A1 | 2/2011 | Albee et al. |
| 2011/0127914 A1 | 6/2011 | Patton et al. |
| 2011/0134628 A1 | 6/2011 | Pesti et al. |
| 2012/0020052 A1 | 1/2012 | McCavit et al. |
| 2012/0024837 A1 | 2/2012 | Thompson |
| 2012/0093491 A1 | 4/2012 | Browder et al. |
| 2012/0155075 A1 | 6/2012 | Asofsky et al. |
| 2012/0206051 A1* | 8/2012 | Nieuwlands ........ H05B 37/0227 |
| | | 315/153 |
| 2013/0271800 A1 | 10/2013 | Kanugo |
| 2014/0168946 A1* | 6/2014 | Kaplan .................... A63J 5/023 |
| | | 362/96 |
| 2014/0177212 A1 | 6/2014 | Li |
| 2015/0109786 A1 | 4/2015 | Li |

FOREIGN PATENT DOCUMENTS

| | | |
|---|---|---|
| EP | 1878449 A1 | 1/2008 |
| GB | 2350962 A | 12/2000 |
| GB | 2391614 A | 2/2004 |
| GB | 2481064 A | 12/2011 |
| GB | 2484375 A | 4/2012 |
| GB | 2488012 A | 8/2012 |
| KR | 1020120098933 | 9/2012 |
| WO | 2006/020839 | 2/2006 |
| WO | 2008/033949 A1 | 3/2008 |
| WO | 2009/026780 A1 | 3/2009 |

* cited by examiner

CANDLE FLAME SIMULATION USING A PROJECTION SYSTEM

This application is a U.S. National Stage filing of PCT/US14/13941, filed Jan. 30, 2014, which claims the benefit of priority to U.S. provisional application having Ser. No. 61/758,602 filed on Jan. 30, 2013. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is electric lighting devices, and especially lighting devices configured to simulate a flickering flame.

BACKGROUND

The following background discussion includes information that may be useful in understanding the present invention. It is not an admission that any of the information provided herein is prior art or relevant to the presently claimed invention, or that any publication specifically or implicitly referenced is prior art.

Various electric lights are known in the art. See, e.g., U.S. Pat. No. 8,132,936 to Patton et al., U.S. Pat. No. 8,070,319 to Schnuckle et al., U.S. Pat. No. 7,837,355 to Schnuckle et al., U.S. Pat. No. 7,261,455 to Schnuckle et al., U.S. Pat. No. 7,159,994 to Schnuckle et al., U.S. pat. publ. no. 2011/0127914 to Patton et al., U.S. Pat. No. 7,350,720 to Jaworski et al.; U.S. Pat. No. 7,686,471 to Reichow; U.S. pat. publ. no. 2005/0285538 to Jaworski et al. (publ. December 2005); U.S. Pat. No. 7,481,571 to Bistritzky et al.; U.S. pat. publ. no. 2008/0031784 to Bistritzky et al. (publ. February 2008); U.S. pat. publ. no. 2006/0125420 to Boone et al. (publ. June 2006); U.S. pat. publ. no. 2007/0127249 to Medley et al. (publ. June 2007); U.S. pat. publ. no. 2008/0150453 to Medley et al. (publ. June 2008); U.S. pat. publ. no. 2005/0169666 to Porchia, et al. (publ. August 2005); U.S. Pat. No. 7,503,668 to Porchia, et al.; U.S. Pat. No. 7,824,627 to Michaels, et al.; U.S. pat. publ. no. 2006/0039835 to Nottingham et al. (publ. February 2006); U.S. pat. publ. no. 2008/0038156 to Jaramillo (publ. February 2008); U.S. pat. publ. no. 2001/0033488 to Chliwnyj; U.S. pat. publ. no. 2008/0130266 to DeWitt et al. (publ. June 2008); U.S. pat. publ. no. 2012/0024837 to Thompson (publ. February 2012); U.S. pat. publ. no. 2011/0134628 to Pestl et al. (publ. June 2011); U.S. pat. publ. no. 2011/0027124 to Albee et al. (publ. February 2011); U.S. pat. publ. no. 2012/0020052 to McCavit et al. (publ. January 2012); U.S. pat. publ. no. 2012/0093491 to Browder et al. (publ. April 2012); and European publ. no. 1878449. However, while various mechanisms have been used to more closely simulate a flickering flame of a candle, such mechanisms suffer from one or more disadvantages.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for improved electric candles and other light sources that more realistically imitate a flickering flame.

SUMMARY OF THE INVENTION

The inventive subject matter provides apparatuses, systems, and methods for simulating a candle flame using a projector, and preferably a pico projector. The projector is disposed within a housing and positioned in a manner to allow either direct or indirect projection onto a flame element or other projection surface. It is contemplated that the flame element can be coupled to the housing such that at least a portion of it extends out of the housing.

In preferred embodiments, the projector is capable of projecting a media file (e.g., an image or video) or colors onto the flame element. The projector is also capable of projecting visible light at an intensity such that the light reflected from the flame element has an intensity of between 2 and 15 lumens.

In another embodiment, a sensor provides feedback to the projector so that when the flame element experiences airflow disturbance, the projector responds with a corresponding projection.

In still further contemplated embodiments, the electric candle or light could include a 3-dimensional hologram projection cube produced using a three-point video projector. An example of such projector is the "HoloAD projector" by InnoVision Labs of Taiwan. A flame image could also be projected onto the projection screen via a pico or other projector.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while portions of the following description is drawn to a computer/server based lighting control system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
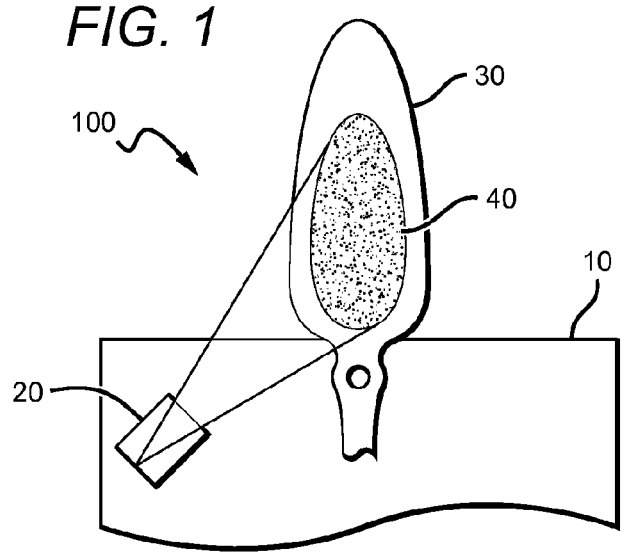
FIG. 1 shows a cross-sectional view of one embodiment of an electric candle that includes a projector disposed within a housing.

FIG. 1 generally depicts a cross-sectional view of a preferred embodiment of the inventive subject matter. It depicts a housing 10, a projector 20, a flame element 30, and a projected image of a flame 40. In this embodiment, the projector 20 directly projects onto the flame element 30 from its location within the housing 10.

Housing 10 can comprise a polymer, a metal, a ceramic, a composite, an optically conductive material, an electronically conductive material, a wood, or a composite thereof. It can be formed into any shape that a traditional wax candle can be formed into. Different embodiments can have housings 10 having varying levels of transparency and can be different colors. Housing 10 preferably resembles a traditional wax candle, although it could include other form factors such as a light bulb appearance.

Projector 20 can be any device capable of projecting light as images, colors, or videos while still being small enough to be disposed within the housing 10, and preferably comprises a pico projector. It should have a lens (e.g., an optical device used to refract light). In preferred embodiments, the projector 20 is disposed within the housing 10 such that it can project visible light onto the flame element 30 either directly or indirectly.

In especially preferred embodiments, projector can comprise a matrix of micro-LEDs controlled by a microprocessor to project an image that is at least partially out of focus onto the flame element. A more detailed description of this projection system can be found in co-pending International Application having serial no. PCT/US14/13867 filed on Jan. 30, 2013.

In embodiments where the projector 20 projects visible light onto a flame element 30 directly, there should exist a direct line-of-sight between the projector 20 and the flame element 30.

In other embodiments, the projector 20 may project visible light indirectly onto the flame element. This can be achieved using a specular surface to reflect the light in a desired direction.

Flame element 30 can comprise a polymer, a metal, a ceramic, a composite, an optically conductive material, an electronically conductive material, a wood, or a composite thereof having a tendency to diffusely reflect visible light. It can be coupled to the housing 10 such that the flame element 30 is able to move relative to the housing 10, but in other embodiments, it can be fixed to the housing 10. Flame element could be injection molded or formed of a laminate.

Device 100 can further include an electromagnet configured to generate a time-varying electromagnetic field and thereby cause movement of the flame element 30 with respect to the housing 10. It is contemplated that the electromagnet can include a coil of wire and timer circuitry that collectively generate the electromagnetic field over time according to a predefined waveform. A description of various waveforms can be found in co-pending U.S. patent publication no. 2013/0286642 to Candella, LLC.

Rather than an electromagnet, it is contemplated that a fan, motor, or other drive mechanism could cause movement of the flame element 30. A discussion of fan-based devices can be found in WIPO patent application having serial no. PCT/US13/65284 filed on Oct. 16, 2013.

Figure 2:
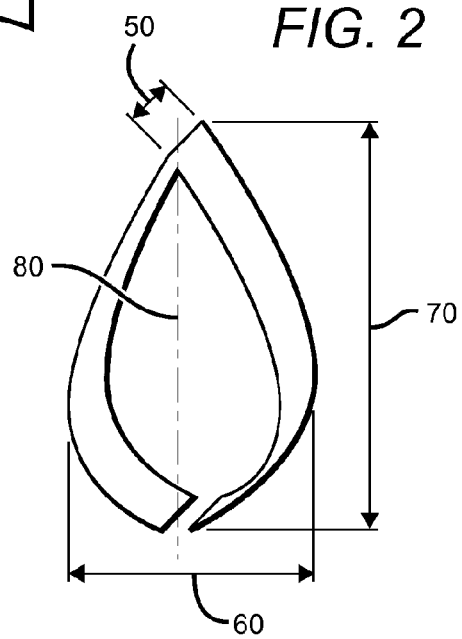
FIG. 2 shows a portion of a flame element.

FIG. 2 shows the general dimensions of an embodiment of a portion of the flame element 30. It generally has a depth 50, width 60, and height 70. The edges can be rounded and the depth can vary as a function of distance from the center (e.g., such that the flame element is round like a candle flame). It can be shaped symmetrically about a vertical axis 80, having the general shape of a candle flame, or it can be asymmetrically shaped about the vertical axis 80.

In some embodiments, the projector 20 projects an image onto the flame element 30, while in others it projects video or simply a set of colors. The projector 20 should be minimally capable of producing colors comprising red, green, and blue.

In some embodiments, the brightness of the projector 20 can be adjusted automatically or manually. The brightness of the projector 20 can be adjusted based on feedback from a sensor detecting air disturbance or ambient light levels, or a human operator can adjust the brightness remotely or locally.

The projector 20 of some embodiments can be a small device comprising a light source, a combiner optic (e.g., a lens), and supporting electronics. It can be capable of projecting an image on an object located in close proximity (e.g., within 5 inches). It can also be capable of projecting video at similar proximity.

Figure 3:
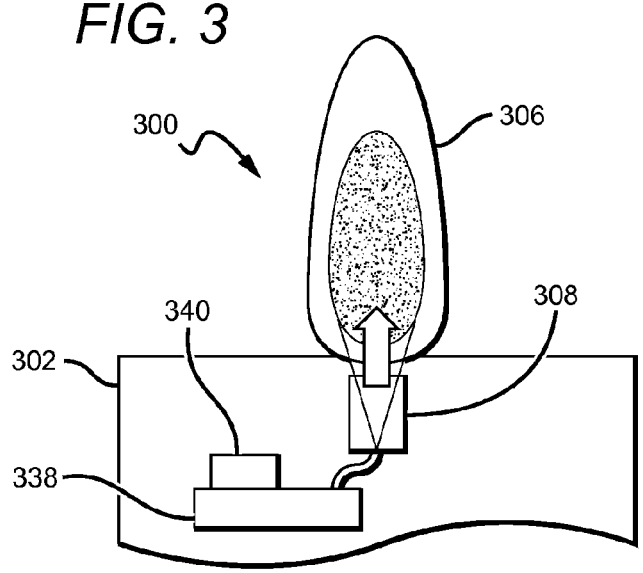
FIGS. 3-5 shows vertical cross-section views of various embodiments of electric candles.

FIG. 3 illustrates another embodiment of an electric candle 300 that simulates a flickering flame. Candle 300 can include a candle shaped housing 302 and a flame element 306 that extends from the housing 302. Candle can further include a pico projector 308 disposed within the housing 302 that projects upwardly toward the flame element 306. Typically, the pico projector 308 will be disposed within the housing 302 such that the projector 308 projects at an angle of between 30-60 degrees toward the flame element 306.

It is contemplated that the flame element 306 could be affixed to the housing 302, or could be coupled to the housing 302 to allow for movement of the flame element 306. Where the flame element 306 can move, the candle 300 preferably includes a drive mechanism to effect movement of the flame element 306.

Projector 308 can be coupled to a microchip 338 and memory 340 that stores one or more media files that could be presented by the projector 308. It is also contemplated that the projector 308 or microchip 338 could be wirelessly coupled to a remote storage unit where media files could be stored and streamed to the projector 308 such as via a wireless network.

Figure 4:
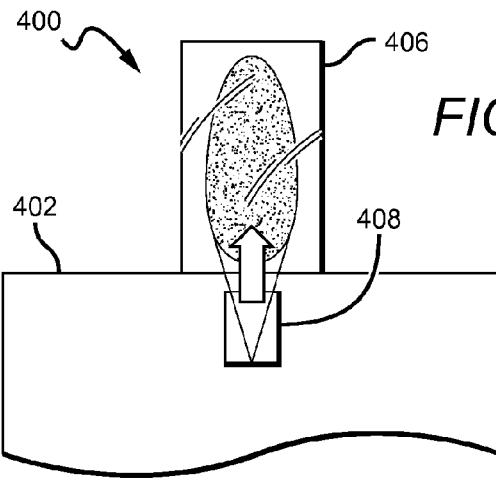

FIG. 4 illustrates yet another embodiment of an electric candle 400 that simulates a flickering flame, where the flame element 406 is composed of an acrylic plastic, paper, or other material that is clear or slightly textured to pick up, reflect, show and or be essentially a movie screen. In such embodiments, it is contemplated that the flame element 406 could be raised and lowered when the candle is on and off, respectively. The flame element 406 could be folded down or simply lowered within the housing 402, for example.

Figure 5:
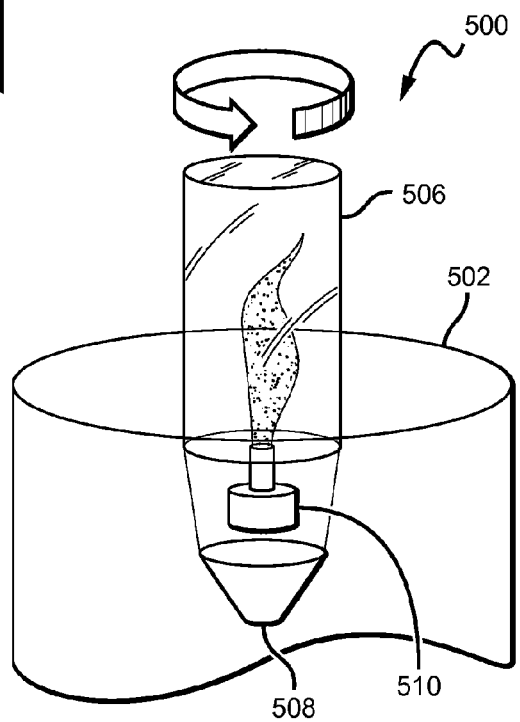

FIG. 5 illustrates another embodiment of an electric candle 500 that simulates a flickering flame through the use of holography. In this embodiment, flame element 506 can comprise a holographic tube that has a plurality of lines or cut-outs. A motor 510 can be used to rotate the holographic tube. As light is projected upwardly by light source 508, the holographic image consisting of the plurality of lines (possibly 1000 lines) scribed on an interior surface of the tube can be seen, giving the appearance of a moving flame. Preferably, the holographic tube is clear so that it is less obtrusive when the candle is off.

Figure 6A:
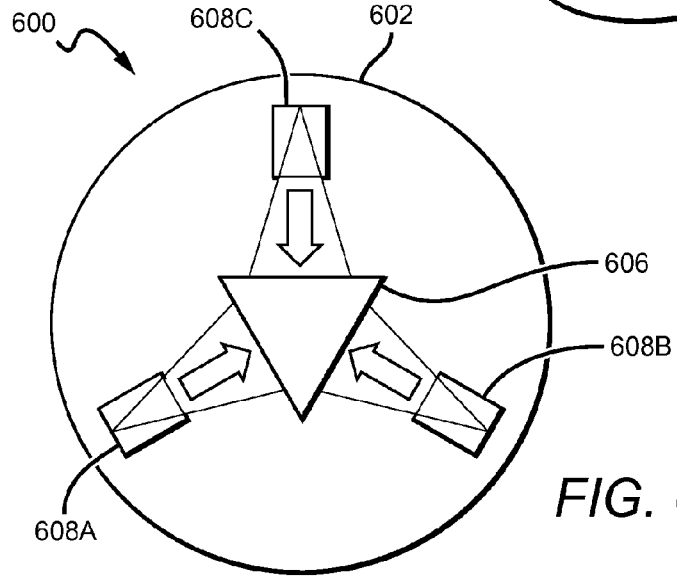
FIGS. 6A-6B show a top view and a side view of one embodiment of an electric candle having multiple projectors.
Figure 6B:
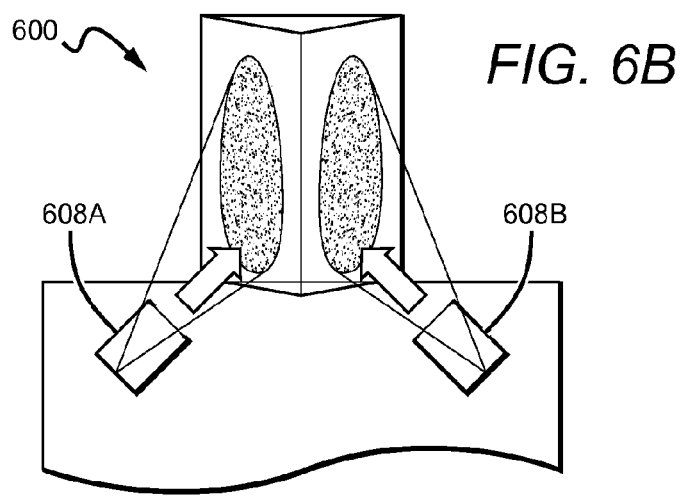

FIGS. 6A-6B illustrate another embodiment of an electric candle 600 having a housing 602 and first, second, and third projectors 608A-608C. The projectors 608A-608C are each preferably disposed within the housing 602, such that they project onto a surface of the flame element 606, which can include a three-sided element. In other contemplated embodiments, flame element 606 could comprise a cylinder, or other shaped surface. In some embodiments, the projection surface of each of the projectors 608A-608C can overlap with a neighboring projection surface.

Where multiple projectors are used, it is preferred that the projection from each of the projectors 608A-608C is coordinated with one another. It is also contemplated that the projection can be coordinated with movement of the flame element 606 in embodiments where the flame element may move with respect to the housing 602. This could be accomplished by having the projectors each project a media file that is pre-coordinated with the expected movement of the flame element based on a waveform that controls the drive mechanism that moves the flame element, for example. In other embodiments, a sensor could be used to detect an orientation of the flame element 606, and then a microprocessor could receive information from the sensor and determine what should be projected from each of the projectors 608A-608C.

Figure 7A:
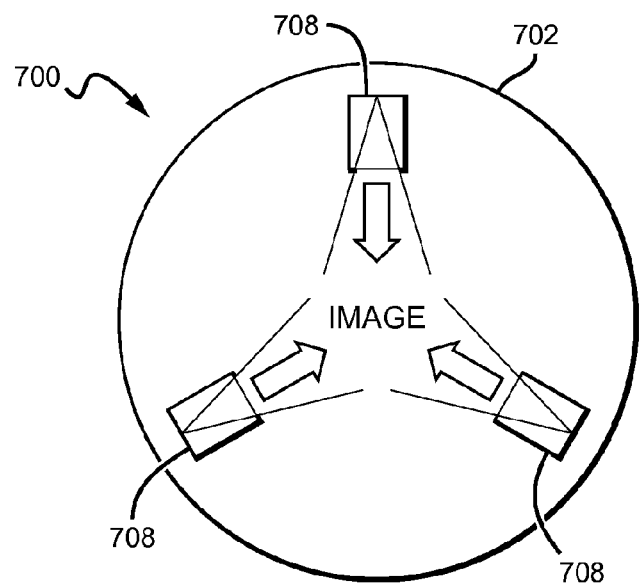
FIGS. 7A-7B show a top view and a side view of one embodiment of an electric candle having multiple projectors and a transient projection screen.
Figure 7B:
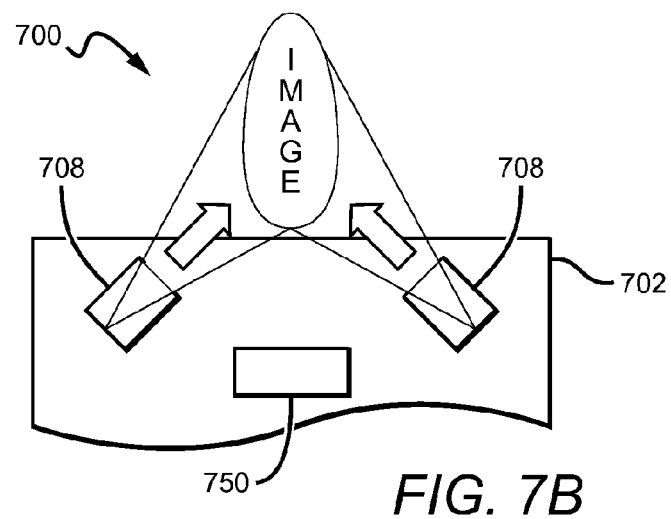

FIG. 7A-7B illustrate another embodiment of an electric candle 700 having a housing 702 and multiple pico projectors 708 that project on to a projection surface. Preferably, the projection surface is transient and may comprise steam or cool mist. In such embodiments, it is contemplated that the candle 700 includes a humidifier 750. This could advantageously be used as a night light or decoration for a child's room for example, where light or media can be projected on to steam or mist produced by the humidifier 750. In other embodiments, the transient surface could comprise smoke or perhaps particles held in a magnetic field.

Other contemplated embodiments include a candle having a sensor to detect at least one of air disturbance and ambient light level and a controller that sends signal to a drive mechanism corresponding to a measurement from the sensor to thereby coordinate movement of the flame element and/or ambient conditions with a projector.

In another embodiment, the electric candle can include a cylinder zoetrope with a light positioned within the housing such that it illuminates the interior surface of the zoetrope on which images of a flame are present. Thus, as the zoetrope rotates, a flame can be seen.

In yet another embodiment, the electric candle can include a motor within the housing having a drive shaft protruding from the housing, a sensor to detect the rotational speed of the drive shaft of the motor, a rectangular piece having at least a first and second side connected to the drive shaft of the motor, and at least a first and second LCD screen on each side of the rectangular piece, wherein the LCD displays an image of a candle flame based on the rotational speed of the drive shaft.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. More-over, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An electric candle that simulates a flickering flame, comprising:
    a candle-shaped housing;
    a projection surface shaped symmetrically to have a concave form with rounded edges and a depth that varies as a function of a distance from a center of the projection surface, wherein the projection surface is coupled to the housing, and extends above an upper surface of the housing; and
    a pico projector disposed within the candle-shaped housing and configured to project an image or video on to a first surface of the projection surface to simulate a flickering flame.

2. The candle of claim 1, wherein the projection surface is affixed to the housing.

3. The candle of claim 1, wherein the pico projector is configured to protect the video that shows a moving flame.

4. The candle of claim 1, wherein the projection surface is pivotally coupled to the housing at a pivot point, such that the projection surface can pivot with respect to the housing at the pivot point.

5. The candle of claim 4, further comprising a sensor configured to detect an orientation of the projection surface with respect to the sensor, and wherein the projected media file is varied as a function of the orientation of the projection surface.

6. The candle of claim 5, further comprising a microprocessor configured to receive information from the sensor about the orientation of the projection surface, and alter a projection of the pico projector.

7. The candle of claim 1, further comprising a second pico projector configured to project onto a second surface of the projection surface.

8. The candle of claim 7, wherein the first and second surfaces of the projection surface overlap.

9. The candle of claim 1, wherein the upper surface of the housing comprises an aperture, and wherein the pico projector is configured to project the media file through the aperture on to the projection surface.

10. The candle of claim 1, wherein the projection surface has a non-planar, curved surface.

11. The candle of claim 7, wherein the projection surface comprises three sides, and further comprising a third projector configured to project onto a third surface of the projection surface, such that each of the first, second and third projectors are disposed to project on to the first, second and third surface, respectively.

12. An electric candle that simulates a flickering flame, comprising:
    a candle-shaped housing;
    a flame element shaped symmetrically to have a concave form with rounded edges and a depth that varies as a function of a distance from a center of the projection surface, wherein the flame element is pivotally coupled to, and extending from, the housing, such that the flame element can pivot with respect to the housing; and
    a micro projector disposed within the candle-shaped housing such that an image or video can be projected on to a first surface of the flame element using the micro projector, wherein the projected image or video is coordinated with a movement of the flame element.

* * * * *